(12) United States Patent
Moscardi et al.

(10) Patent No.: US 8,338,543 B2
(45) Date of Patent: Dec. 25, 2012

(54) POLYOLEFIN THERMOPLASTIC VULCANIZATE ELASTOMERS

(75) Inventors: Gilberto Moscardi, Ferrara (IT); Enrico Costantini, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 592 days.

(21) Appl. No.: 12/308,625

(22) PCT Filed: May 15, 2007

(86) PCT No.: PCT/EP2007/054678
§ 371 (c)(1), (2), (4) Date: Dec. 19, 2008

(87) PCT Pub. No.: WO2007/147687
PCT Pub. Date: Dec. 27, 2007

(65) Prior Publication Data
US 2010/0240784 A1    Sep. 23, 2010

Related U.S. Application Data

(60) Provisional application No. 60/817,542, filed on Jun. 29, 2006.

(30) Foreign Application Priority Data

Jun. 23, 2006  (EP) ..................... 06115974

(51) Int. Cl.
*C08F 8/00* (2006.01)
*C08C 19/00* (2006.01)
*C08L 23/04* (2006.01)

(52) U.S. Cl. ............. 525/332.5; 525/192; 525/193; 525/194; 525/240; 525/241; 521/144

(58) Field of Classification Search .......... 525/240, 525/192, 193, 194, 241, 332.5; 521/144
See application file for complete search history.

(56) References Cited

U.S. PATENT DOCUMENTS

| | | | |
|---|---|---|---|
| 4,948,840 A | 8/1990 | Berta | |
| 4,963,612 A | 10/1990 | Braga et al. | |
| 5,143,978 A | 9/1992 | Berta | |
| 5,145,819 A | 9/1992 | Winter et al. | |
| 5,244,976 A * | 9/1993 | Brosius et al. | 525/193 |
| 5,286,564 A * | 2/1994 | Cecchin et al. | 428/402 |
| 5,324,800 A | 6/1994 | Welborn, Jr. et al. | |
| 5,536,349 A * | 7/1996 | Marzola et al. | 156/187 |
| RE37,384 E | 9/2001 | Winter et al. | |
| 6,476,132 B1 | 11/2002 | Abdou-Sabet et al. | |
| 2004/0127631 A1* | 7/2004 | Kanamori et al. | 524/523 |
| 2004/0198919 A1 | 10/2004 | Pelliconi et al. | |
| 2004/0236032 A1* | 11/2004 | Bacci et al. | 525/333.7 |
| 2005/0059783 A1 | 3/2005 | Furrer et al. | |
| 2006/0155072 A1 | 7/2006 | Rakhman et al. | |

FOREIGN PATENT DOCUMENTS

| | | |
|---|---|---|
| EP | 129368 | 12/1984 |
| EP | 472946 | 3/1992 |
| EP | 485823 | 5/1992 |
| EP | 619343 | 10/1994 |
| EP | 633289 | 1/1995 |
| EP | 1072644 | 1/2001 |
| WO | 03/011962 | 2/2003 |
| WO | 2004/055083 | 7/2004 |
| WO | 2005/005532 | 1/2005 |
| WO | 2009/053222 | 4/2009 |

* cited by examiner

*Primary Examiner* — Randy Gulakowski
*Assistant Examiner* — Kara Boyle
(74) *Attorney, Agent, or Firm* — Dilworth IP LLC

(57) ABSTRACT

Thermoplastic vulcanizate elastomer obtained by dynamic vulcanization of a heterophasic polyolefin composition in presence of at least (i) an alkenyl-substituted alkoxysilane grafting agent and (ii) water;

wherein said heterophasic polyolefin composition has flexural modulus equal to or lower than 150 MPa, and comprises:

(a) a crystalline propylene homopolymer or copolymer of propylene with up to 15% of ethylene or other alpha-olefin comonomer(s), or their combinations, and (b) a copolymer or a composition of copolymers of ethylene with other alpha-olefins, containing from 15% to 40% of ethylene, said thermoplastic vulcanizate elastomer having compression set values in the range from 45-65%, the ratio of elongation at break to compression set values over 10 and hardness shore A values below 90.

18 Claims, No Drawings

POLYOLEFIN THERMOPLASTIC VULCANIZATE ELASTOMERS

This application is the U.S. national phase of International Application PCT/EP2007/054678, filed May 15, 2007, claiming priority to European Application 06115974.5 filed Jun. 23, 2006 and the benefit under 35 U.S.C. 119(e) of U.S. Provisional Application No. 60/817,542, filed Jun. 29, 2006; the disclosures of International Application PCT/EP2007/054678, European Application 06115974.5 and U.S. Provisional Application No. 60/817,542, each as filed, are incorporated herein by reference.

The present invention relates to polyolefin thermoplastic vulcanizate elastomers having very high elongation at break values and low compression sets which characterize them, together with low Shore A hardness values.

The compositions of the present invention are suitable for the manufacture of soft and flexible products with good elastic properties, such as medical tubing, intravenous bags, fittings, skin for dashboards, door panels, sunvisors, interior trims, windows seals, wire & cables, and particularly for the manufacture of high performance automotive products, such as "under the hood" automotive products, and components of appliances such as hoses, seals and gaskets for washing machines and dishwashers ducts.

The above mentioned characteristics and properties are obtained by subjecting to dynamic cross-linking heterophasic polyolefin compositions which are not cross-linked, said compositions containing crystalline propylene homopolymers or copolymers and elastomeric olefin polymers with a low ethylene content (less than 40% by weight in the fraction soluble in xylene at ambient temperature).

U.S. Pat. No. 4,963,612 describes partially cross-linked polyolefin compositions comprising a polypropylene fraction which is not cross-linked and a partially cross-linked ethylene/propylene elastomer optionally containing dienes. In the examples, the content of ethylene of the ethylene/propylene elastomers before crosslinking is higher than 60% by weight in the absence of dienes, and is the majority component also when a diene is present. The examples show that the above mentioned compositions display very low elongation at break values ranging from 250 to 410%. Other partially cross-linked polyolefin compositions are described in U.S. Pat. Nos. 4,948,840 and 5,143,978. The soluble fraction in xylene at ambient temperature, substantially made up of the non-cross-linked amorphous fraction of the elastomer used in the preparation of said compositions, is an ethylene/propylene copolymer containing from 40 to 70% of ethylene; moreover, the elastomer contains a further ethylene-rich copolymeric fraction which brings the ethylene content over 40%. The examples of the above mentioned patents show that the partially cross-linked compositions obtained in this manner, have considerably low elongation at break values. Moreover, crosslinking is obtained in U.S. Pat. No. 4,963,612 and U.S. Pat. Nos. 4,948,840 and 5,143,978 with organic peroxide treatment in the presence of further co-agents such as furan derivatives, dienes sulphur donors and the like.

International patent application WO05/005532 discloses a process for making a thermoplastic vulcanizate by alkoxysilane grafting and further crosslinking a polyolefin composition in the presence a water-generating solid agent. Ethylene is the major component in the crosslinkable disperse phase polymer, when it is an ethylene or ethylene-alpha olefin copolymer. High values of elongation at break are never achieved, in the examples, with boric acid used as a water-developing agent.

US patent application 2005/0059783 describes the use of alkoxysilane and peroxides and optionally a condensation catalyst for a dynamical cross-linking process producing thermoplastic vulcanizates starting from polyolefins, particularly polyethylene and copolymers of ethylene. The cross-linking is accomplished using an organo-alkoxysilane, a peroxide and moisture or liquid water. Values of elongation at break below 500% are achieved in the examples.

International patent application WO04/055083 discloses a process for making a thermoplastic vulcanizate by alkoxysilane grafting a polyolefin composition and subsequent addition of a solid water generating crosslinking agent. A blend is obtained in the reactor by mixing a matrix polymer and a resilient polymer with the grafting and crosslinking agents in the presence of extender oils to improve processability. Ethylene is the major component of the resilient polymer (interpolymer) and high values of elongation at break are not exhibited by the thermoplastic vulcanizate obtained in the absence of additional fillers.

European patent application EP-A-0633289 discloses soft partially cross-linked polyolefin compositions with a low ethylene content, less than or equal to 35% by weight, having very low flexural modulus values, elongation at break values higher than those of the compositions described for in the previously commented documents, good compression set values and processability, due in particular to the low content of cross-linked elastomer. The partially cross-linked polyolefin compositions of EP-A-0633289 are obtained by subjecting the starting material to dynamic cross-linking with organic peroxides and co-agents. Peroxides are used in quantities ranging from 0.5% to 5% by weight, with respect to the total weight of the composition which is subjected to cross-linking. Co-agents are cyanurates, acrylates, benzene or furan derivatives and sulphur donors that are used in quantities ranging from 0.1% to 8% by weight, with respect to the total weight of the composition. Co-agents are substances with a negative environmental impact in addition to the known adverse organoleptic properties of organic peroxides. Indeed, the partially cross-linked polyolefin compositions obtained exhibit a ratio of compression set value versus elongation at break that is still not satisfactory.

There remains a need for thermoplastic vulcanizate elastomers and polymer compositions comprising such elastomers, particularly for the production of manufactured articles in form of films or flexible foils, injection molded articles or extruded section articles, having good processability (to avoid adding extender oils) and an optimal balance of mechanical properties particularly for injection moulded articles, like gaskets and seals, obtainable with one step or two steps dynamic vulcanization processes with improved environmental impact. It would be particularly desirable to achieve such properties with polyolefin compositions obtained by the sequential polymerization process that will be better described herein below.

Therefore, the present invention provides a thermoplastic vulcanizate elastomer obtained by dynamic vulcanization of a heterophasic polyolefin composition (I) in presence of at least:
(i) an alkenyl-substituted alkoxysilane grafting agent; and
(ii) water;
wherein said heterophasic polyolefin composition (I) has flexural modulus equal to or lower than 150 MPa, preferably lower than 100, and comprises:
(a) a crystalline propylene homopolymer or copolymer of propylene with up to 15% by weight of ethylene or other alpha-olefin comonomer(s), or their combinations; and (b) a copolymer or a composition of copolymers of ethylene with other alpha-olefins containing from 15% by weight to less than 40% by weight of ethylene, preferably from 15% to 38%, more preferably from 15 to 35%, in particular from 20 to 38 and more particularly from 20 to 35% by weight of ethylene.

said thermoplastic vulcanizate elastomer having compression set values from 45 to 65%, preferably from 50 to 55%, a ratio of elongation at break to compression set values over 10, preferably over 10.5, more preferably over 11.5, and hardness shore A values below 90, preferably below 85. Preferred is a thermoplastic vulcanizate elastomer having elongation at break values over 600, preferably over 640.

In particular, the said alpha-olefin comonomers in the heterophasic composition (I) are selected from C4-C10 alpha-olefins for component (a) and C3-C10 alpha-olefins for component (b).

Examples of the above mentioned C3-C10 and C4-C10 alpha-olefins for the heterophasic composition (I) are propylene, butene-1, pentene-1,4-methylpentene, hexene-1, octene-1. The preferred comonomers are propylene and butene-1.

The preferred comonomer in the propylene copolymers of component (a) is ethylene. When ethylene is the comonomer in component (a) it is preferably present in amounts up to 8% by weight of the component (a).

Preferred comonomers in the ethylene copolymers of component (b) are propylene and/or butene-1.

Preferred are the heterophasic compositions (I) comprising (weight percentages):
1) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more that 80% (component a);
2) 60-95% of an elastomeric fraction of one or more copolymer(s) of ethylene said copolymer(s) containing up to 40% of ethylene, and being soluble in xylene at ambient temperature in an amount of more that 70% (component b)

Particularly preferred are the heterophasic compositions (I) comprising (weight percentages):
1) 5-40% of component (a) as defined above;
2) 60-95% of a fraction of one or more copolymer(s) of ethylene with propylene and/or C4-C10 alpha-olefin(s) said copolymer(s) containing from 15 to 40% of ethylene, and being soluble in xylene at ambient temperature (fraction b 1); and
3) 0-30%, with respect to the sum of component (a) and fraction (b 1), of a copolymer fraction containing ethylene, said fraction being insoluble in xylene at ambient temperature (fraction δ 2).

The solubility and insolubility of the said polymer components and fractions are defined as fractions soluble or insoluble in xylene at ambient temperature, i.e., around 25° C. When present, said fraction (b 2) preferably exceeds 1% by weight, more preferably ranging from 1 to 25% by weight with respect to the sum of component (a) and fraction (b 1).

Preferably the percent by weight of the sum of (b 1) and (b 2) fractions with respect to the weight of the heterophasic polyolefin composition (I) is of from 50% to 90% and the (b 2)/(b 1) weight ratio is lower than 0.4. The content of ethylene in fraction (b 2) is preferably at least 75% by weight, more preferably at least 80% by weight, with respect to the total weight of fraction (b 2). The comonomers in the copolymer fraction (b 2) are preferably the same as those of the copolymer fraction (b 1). An example of copolymer fraction (b 2) is an essentially linear semicrystalline copolymer of ethylene with propylene, a specific example of which is linear low density polyethylene (LLDPE).

More particularly preferred are the heterophasic compositions (I) comprising (weight percentages):
(a) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more that 80% (component a);
(b) 60-95% of a fraction of copolymers of ethylene with propylene and/or C4-C10 alpha-olefin(s), comprising:
(1) a first elastomeric copolymer containing from 15 to 32% by weight of ethylene, preferably from 20 to 30, and having solubility in xylene at room temperature greater than 50% by weight, the intrinsic viscosity of the xylene soluble fraction ranging from 3.0 to 5.0 dl/g; and
(2) a second elastomeric copolymer containing more than 32% up to 45% by weight of ethylene, preferably from 35 to 40%, and having solubility in xylene at room temperature greater than 80% by weight, the intrinsic viscosity of the xylene soluble fraction ranging from 4.0 to 6.5 dl/g; the (1)/(2) weight ratio ranging from 1:5 to 5:1, preferably from 1:2 to 4:1, and more preferably from 1:1 to 2:1.

The said heterophasic compositions can be prepared by blending component (a) and (b), or component (a) and fraction (b 1), and optionally fraction (b 2), or components (a), (b)(1) and (b)(2) in the molten state, that is to say at temperatures greater than their softening or melting point, or more preferably by sequential polymerization in the presence of a highly stereospecific Ziegler-Natta catalyst. In particular, the catalyst system used comprises (i) a solid catalytic component containing a titanium compound and an electron-donor compound, both supported on magnesium chloride, and (ii) an Al trialkyl compound and optionally an electron-donor compound.

Other catalysts that may be used are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. These metallocene catalysts may be used in particular to produce the component (b).

The above mentioned sequential polymerization process for the production of the heterophasic composition (I) comprises at least two stages, where in one or more stage(s) propylene is polymerized, optionally in the presence of the said comonomer(s), to form component (a), and in one or more additional stage(s) mixtures of ethylene with said C3-C10 alpha-olefin(s), are polymerized to form component (b).

The polymerization processes are carried out in liquid, gaseous, or liquid/gas phase. The reaction temperature in the various stages of polymerization can be equal or different, and generally ranges from 40 to 90° C., preferably from 50 to 80° C. for the production of component (a), and from 40 to 60° C. for the production of component (b).

Examples of sequential polymerization processes are described in European patent application EP-A-472946 and in WO03/011962.

As a way of example, the heterophasic composition (I) has MFR values ranging from 0.1 to 20 g/10 min, preferably from 0.2 to 15 g/10 min. The heterophasic composition with said melt flow rate values can be obtained directly during the polymerization process; as an alternative, said heterophasic composition can be subjected to a chemical visbreaking process carried out in the presence of the appropriate visbreaking agents, such as peroxides. Said chemical visbreaking process is carried out according to well known methods.

Typically, the total content of polymerized ethylene in the heterophasic composition (I) ranges from 15 to 35% by weight, in particular from 15 to 30% by weight.

The molecular weight of the various components and fractions of the heterophasic composition (I) (determined by measuring the intrinsic viscosity in tetrahydronaphtalene at 135° C.) varies in function of the nature of the components, and the total melt flow rate of the composition. In particular, the intrinsic viscosity is preferably comprised between the following limits: 0.5-3 dl/g for component (a), and 2-8 dl/g for component (b).

The compositions of the present invention have haze values generally lower than 40%, preferably lower than 30%. Indeed, the compositions of the present invention exhibit an optimal balance of mechanical properties and particularly it is surprisingly observed that, together with very low compression set values, the ratio of elongation at break vs compression set values is always over 10 with definite advantage for the injection moulding and compression moulding applications, and particularly for gasket and seals that require low compression sets values and high elongation at break. Moreover, the thermoplastic vulcanizates of the present invention are suitable for food application thanks to the reduction of the peroxide amounts required and the elimination of the use of coagents and in some cases also of the hydrolysis catalyst (a Lewis acid, usually an organic tin compound). Indeed, the above properties can easily be obtained due to the use of thermoplastic vulcanizate elastomers of the present invention, without the need for adding extender oils. The thermoplastic vulcanizate elastomer of the present invention are prepared by dynamic vulcanization, that is subjecting an uncross-linked heterophasic polyolefin composition to a mixing process and adding while mixing a grafting agent and further a cross-linking agent. Generally, any organoalkoxysilane/peroxide agent known in the art can be used as grafting agent for the preparation of the thermoplastic vulcanizate polyolefin compositions of the present invention. In particular, examples of alkoxysilane monomers are alkenyl-substituted alkoxysilanes, particularly suitable are vinyl-trimethoxysilane (VTMS) and methacryloylpropyl-trimethoxysilane (VMMS). The alkoxysilanes are generally used in quantities ranging from 1% to 10%, preferably from 2% to 7% by weight with respect to the total weight of heterophasic composition (I). Organic peroxides, preferably have a half-life in the ethylene-propylene-diene rubbers (EPDM) of less then 1 minute at 200° C.

Examples of peroxides are: 1,1'-bis(tert-butylperoxy)diisopropylbenzene; dicumyl peroxide; n-butyl-4,4'-bis(tert-butylperoxy)valerate; 2,5-di(tert-butylperoxy)2,5-dimethylhexane. The peroxides are generally used in quantities ranging from 0.05% to 1%, preferably from 0.1% to 0.8% by weight with respect to the total weight of heterophasic composition (I).

One advantage in the use of alkoxysilane/peroxide as grafting agent for the vulcanization of a polyolefin composition is the considerable reduction in the use of peroxides with respect to the peroxide/coagent processes.

The crosslinking is obtained by contacting the composition with water or moisture during the process. Particularly preferred is the use of an in-situ water-developing agent. Examples of in situ water-developing crosslinking agents are calcium citrate tetrahydrate, calcium lactate pentahydrate, magnesium sulfate eptahydrate, sodium sulfate decahydrate, blends of zinc oxide and carboxylic acid, adipic acid, boric acid and blends thereof. Preferred agent of this type is boric acid $B(OH)_3$ that is a compound that develops water by thermal decomposition at a temperature higher than 100° C. giving 43.7 g water/100 g according to the following reaction:

$$B(OH)_3 => 1/2 B_2O_3 + 3/2 H_2O$$

The alkyl-methoxysilane hydrolysis reaction with boric acid is the following:

$$RSi(OMe)_3 + 2B(OH)_3 => B_2O_3 + 3MeOH + RSi(OH)_3$$

2 moles of boric acid per mole of methoxysilane are needed for the complete hydrolysis. The water-developing agent is introduced after the grafting reactions have reached the desired degree of completion. The grafting and cross-linking steps can be performed sequentially in a batch reactor. In the case of a continuous process (e.g. in a single or twin screw extruder) the crosslinking agent is added with an additional feeder at a point along the reactor where the desired grafting degree is reached.

As previously stated, the thermoplastic vulcanizate elastomers of the present invention are prepared by dynamic vulcanization. Said dynamic vulcanization consists of subjecting the above mentioned noncross-linked heterophasic polyolefin compositions to a blending process at a temperature higher than or equal to the softening or melting point of their components, in the presence of the grafting and cross-linking agents. The grafting agent can be added before, or after a first blending stage and the cross-linking agent is added after the grafting stage while continuing said blending. The blending can be done in an internal mixer, in an extruder, or in a system comprising an internal mixer and an extruder.

The temperature at which the dynamic vulcanization is carried out preferably ranges from 160° C. to 220° C. Grafting time preferably ranges from 30 seconds to 15 minutes. Cross-linking time preferably ranges from 5 seconds to half an hour. Grafting and cross-linking times can be evaluated, in an internal mixer, by measuring the time needed to achieve an adequate stabilization of the torque value after the addition of the respective agents. Mineral fillers, carbon black, dyes, plasticizers, stabilizing agents, extender oils, and all additives in general which are typical of polyolefin compositions containing elastomers, can be added to the composition which is subjected to mixing and dynamic grafting and cross-linking.

The thermoplastic vulcanizate elastomers of the present invention can also be foamed, and an additional advantage of the present invention is that from the thermoplastic vulcanizate elastomers one can obtain foamed polyolefin compositions having regularly shaped cells, not collapsed, having excellent mechanical properties (high elongation at break values, for example). Moreover, the products made from the above mentioned foamed polyolefin compositions have a smooth and regular surface.

The density of the foamed polyolefin compositions according to the present invention ranges preferably from 0.2 to 0.6 g/cm3.

To obtain foamed polyolefin compositions one can use processes and foaming agents commonly known in the art. In particular, one can use physical type foaming agents, such as hydrocarbons, optionally fluorinated and/or chlorinated, whose boiling point is above 25° C., for example pentane, hexane, dichlorotrifluoroethanes and methylene chloride, or gaseous or liquid compounds having a boiling point below 25° C., for example air, nitrogen, carbon dioxide, chlorofluoromethane, dichlorodifluoromethane, butane, propane and isobutane. Other foaming agents that can be used are the chemical types which develop gas either by thermal decomposition or by chemical reaction. Examples of chemical foaming agents are: azodicarbamide, barium azodicarboxylate, phenylsulfone, mixtures of sodium bicarbonate and citric acid, sodium borohydrate, gypsum and hydrated aluminas.

To prepare the foamed compositions extruders commonly known in the art can be used, including single-screw extruders. The physical type foaming agent is preferably injected or introduced into the melted polymer mass inside the extruder at a distance from the solid polymer feeding point where said polymer is in the form of a melted and homogeneous mass. The temperature in the section of the extruder where the foaming agent is introduced preferably ranges from 125° C. to 250° C. The chemical type foaming agents can be mechanically blended with the solid polymer before extrusion. The dry blend thus obtained is then introduced into the first feeding area of the extruder, said area being maintained at a temperature from 130° C. to 200° C. The temperature that is maintained at the extruder output, equipped with the proper die, e.g. a die with circular holes or a flat die, has to be adequate for the polymer to foam. Said temperature preferably ranges from 125° C. to 180° C. The quantity of physical foaming agent which is added to the polymer composition preferably ranges from 0.5% to 30% by weight with respect to the polymer composition, most preferably from 0.5% to 15%. The quantity of chemical foaming agent preferably ranges from 0.2% to 10%, more preferably from 0.3% to 5%.

One can also add to the polymer mass, either before or during extrusion, one or more nucleating agents (cellulation nucleants), in quantities generally ranging from 0.05% to 3% by weight with respect to the polymer. Examples of the above mentioned nucleating agents are talc and colloidal silica.

Other additives, dyes or fillers which may be required can also be added before or after extrusion.

The following examples are given in order to illustrate and not limit the present invention. For the thermoplastic vulcanizate elastomers of the present invention, the data relative to the properties reported have been determined according to the methods indicated below. For the measurements requiring molded specimens, samples of the thermoplastic vulcanizate were compression molded in order to obtain plaques 2.5 mm thick. The molten polymer mass was placed between two plates and preheated for 5 minutes at T=180° C. A pressure of 100 bars was then applied and the sample held for further 5 minutes at the same temperature. Then, the plaques were placed between two water-cooled press plates to quench the sample. The methods used to obtain the data relative to the properties reported in the examples and the description are listed below.

| Property | Method |
|---|---|
| Melt Flow Rate (MFR) | ISO 1133 (230° C./2.16 kg), except where differently specified; |
| Density | ASTM D 3575/W |
| Solubility in xylene (XS) | (see note below). |
| Flexural modulus | ISO method 178 with speed of 2 mm/min., on injection moulded specimens 4 mm thick, 80 mm long, 10 mm wide, injection moulded according to ISO 294; |
| Tensile elongation at break | ISO 527/-1, -2 with speed of 50 mm/min., on specimens (type V) cut from 2 mm thick plaques; |
| Compression set | ASTM D 395 method B |
| Hardness (Shore A) | ASTM D-2240 |
| Haze | ASTM D 1003 |

Note:
solubility in xylene 2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature (Xylene Solubles—XS) is then calculated. The percent by weight of polymer insoluble in xylene at room temperature is considered the isotactic index of the polymer. This value corresponds substantially to the isotactic index determined by extraction with boiling n-heptane, which by definition constitutes the isotactic index of polypropylene.

EXAMPLE 1

An heterophasic polyolefin composition (I), obtained by sequential copolymerization in the presence of a high-yield and highly specific Ziegler-Natta catalyst supported on magnesium chloride, is cross-linked. Said composition [composition (a) in table 1] consists of the following components (percentages by weight):
A) 32% of a crystalline copolymer of propylene with ethylene, containing about 4% of ethylene;
B) 3% of a mainly linear ethylene/propylene copolymer, insoluble in xylene at ambient temperature, and containing about 15% of propylene;
C) 65% of a propylene/ethylene amorphous copolymer soluble in xylene at ambient temperature, having an intrinsic viscosity in tetrahydronaphthalene at 135° C. equal to 2.95 dl/g and containing 30% of ethylene.

Moreover, the above composition (a) possesses the properties reported in table 1, measured with the previously described methods.

The vulcanization was carried out dynamically operating in a Brabender mixer Plasticorder PL 2100. Composition (a) and the additives indicated in Table 2 were fed in the mixer and the grafting and crosslinking reactions were carried out in two consecutive steps.

In the grafting step:
the peroxide masterbatch Trigonox 101/50 (2,5-bis(tert-butylperoxy)-2,5-dimethylhexane, DHBP, 50% on silica carrier) from Akzo Chemicals;
the alkoxysilane VTMS A-171 by OSI specialties (Crompton); and
the hydrolysis catalyst di-n-butyl-tin-dilaurate (DBTL) by ACIMA.
were mixed with composition (a) before loading them into the mixing chamber. The temperature was set at 160° C. and the blade speed at 60 revolutions per minute (RPM).

The silane grafting was carried out for 8 minutes.
The crosslinking step was then carried out dynamically by adding boric acid as water-developing agent in the Brabender and further mixing for 10 minutes.

The amounts of composition (a) and additives (weight percentages) and the properties of the vulcanized composition obtained are reported in Table 2

EXAMPLE 2

Example 1 was repeated with water as crosslinking agent instead of boric acid. The crosslinking step was carried out dynamically by adding gradually a large excess of water in the Brabender after the completion of the grafting reaction and mixing for further 5-10 minutes.

The amounts of composition (a) and additives (weight percentages) and the properties of the vulcanized composition obtained are reported in Table 2

EXAMPLE 3

A heterophasic polyolefin composition (I) [composition (b) in table 1], was obtained by sequential copolymerization in the presence of a high-yield and highly specific Ziegler-Natta catalyst supported on magnesium chloride. Said composition (b) had a content of fraction soluble in xylene at room temperature of 76% by weight, and comprised (weight percentages) 17% of a crystalline copolymer of propylene with 3.3% of ethylene, and 83% of an elastomeric fraction of propylene with ethylene containing 32% of ethylene. Moreover the above composition (b) possessed the properties reported in table 1, measured with the previously described methods.

The vulcanization was carried out dynamically operating in a Brabender mixer Plasticorder PL 2100. Composition (b) and the additives indicated in Table 2 were fed in the mixer and the grafting and crosslinking reactions were carried out in two consecutive steps. In the grafting step:
 the peroxide masterbatch Trigonox 101/50 (2,5-bis(tert-butylperoxy)-2,5-dimethylhexane, DHBP, 50% on silica carrier) from Akzo Chemicals;
 the alkoxysilane VMMS A-174 NT by GE Silicones; and
 the hydrolysis catalyst di-n-butyl-tin-dilaurate (DBTL) by ACIMA.
were mixed with composition (b) before loading them into the mixing chamber. The temperature was set at 160° C. and the blade speed at 60 revolutions per minute (RPM).

The silane grafting was carried out for 8 minutes.

The crosslinking step was then carried out dynamically by adding boric acid as water-developing agent in the Brabender and further mixing for 10 minutes.

The amounts of composition (b) and additives (weight percentages) and the properties of the vulcanized composition obtained are reported in Table 2.

EXAMPLE 4

Example 3 was repeated with the alkoxysilane VTMS A-171 by OSI specialties (Crompton) instead of VMMS in the grafting step as reported in table 2.

The amounts of composition (b) and additives (weight percentages) and the properties of the vulcanized composition obtained are reported in Table 2.

EXAMPLE 5

Composition (b) was vulcanized dynamically operating in a Leistritz Micro 27 twin screw extruder with a diameter of 27 mm and a length/diameter ratio of 17.

Composition (b) and the grafting additives indicated in Table 2 were fed in a first blending zone. The cross-linking was carried out by injection of water with a side-feeder (water feed=90 g/h at 20 bar) located at about one third from the end of the screw. Connected to the end of the last blending zone is an area where the gases deriving from the decomposition of the peroxide and the excess water were vented.

The blending times used in the grafting and cross-linking zones are respectively 30 seconds for the grafting step and 10 seconds for the crosslinking. Temperature raised along the extruder from 170° C. to 210° C.

The amounts of composition (b) and additives (weight percentages) and the properties of the vulcanized composition obtained are reported in Table 2.

COMPARATIVE EXAMPLE 1 (1c)

A polyolefin composition [composition (c)] consisting of the following components (percentages by weight):
A) 70% of Engage 8003, an ethylene-octene copolymer by Dow Chemical, that is believed to contain 70% by weight of ethylene and 30% by weight of 1-octene, having a Mooney viscosity of 22 (ML1+4 at 121° C.), MFR (190° C./2.16 kg) of 1.0 g/10 min. and a density of 0.885 g/cm$^3$;
B) 30% of a propylene homopolymer, obtained with a Ziegler-Natta catalyst, having MFR of 33 g/10 min (230° C./2.16 Kg) ISO 1133 and flexural Modulus of 1390 MPa.
was vulcanized dynamically operating in a Brabender mixer Plasticorder PL 2100. Composition (c) and the additives indicated in Table 1 were fed in the mixer and the grafting and crosslinking reactions were carried out in two consecutive steps.

In the grafting step:
 the peroxide masterbatch Trigonox 101/50 (2,5-bis(tert-butylperoxy)-2,5-dimethylhexane, DHBP, 50% on silica carrier) from Akzo Chemicals;
 the alkoxysilane VTMS A-171 by OSI specialties (Crompton); and
 the hydrolysis catalyst di-n-butyl-tin-dilaurate (DBTL) by ACIMA.
were mixed with composition (c) before loading them into the mixing chamber. The temperature was set at 160° C. and the blade speed at 60 revolutions per minute (RPM).

The silane grafting was carried out for 8 minutes.

The crosslinking step was then carried out dynamically by adding boric acid as water-developing agent in the Brabender and further mixing for 10 minutes.

The amounts (weight percentages) of composition (c) and additives and the properties of the vulcanized composition obtained are reported in Table 3.

COMPARATIVE EXAMPLE 2 (2c)

A polyolefin composition [composition (d)] consisting of the following components (percentages by weight):
A) 60% of Engage 8003, an ethylene-octene copolymer by Dow Chemical, that is believed to contain 70% by weight of ethylene and 30% by weight of 1-octene, having a Mooney viscosity of 22 (ML1+4 at 121° C.), MFR (190° C./2.16 kg) of 1.0 g/10 min. and a density of 0.885 g/cm$^3$;
B) 40% of a random propylene-ethylene copolymer having 2.5% by weight of ethylene, a Xilene Soluble fraction XS of 7% and MFR of 1.2 g/10 min (230° C./2.16 Kg) ISO 1133.
Was vulcanized dynamically operating in a Brabender mixer Plasticorder PL 2100. Composition (d) and the additives indicated in Table 1 were fed in the mixer and the grafting and crosslinking reactions were carried out in two consecutive steps.

In the grafting step:
 the peroxide masterbatch Trigonox 101/50 (2,5-bis(tert-butylperoxy)-2,5-dimethylhexane, DHBP, 50% on silica carrier) from Akzo Chemicals;
 the silane VTMS A-171 by OSI specialties (Crompton); and
 the hydrolysis catalyst di-n-butyl-tin-dilaurate (DBTL) by ACIMA.
were mixed with composition (c) before loading them into the mixing chamber. The temperature was set at 160° C. and the blade speed at 60 revolutions per minute (RPM). The silane grafting was carried out for 8 minutes.

The crosslinking step was then carried out dynamically by adding boric acid as water-developing agent in the Brabender and further mixing for 10 minutes.

The amounts (weight percentages) of composition (d) and additives and the properties of the vulcanized composition obtained are reported in Table 3.

COMPARATIVE EXAMPLE 3 (3c)

A polyolefin composition [composition (e)] consisting of the following components (percentages by weight):
A) 80% of Engage 8003, an ethylene-octene copolymer by Dow Chemical, that is believed to contain 70% by weight of ethylene and 30% by weight of 1-octene, having a Mooney viscosity of 22 (ML1+4 at 121° C.), MFR (190° C./2.16 kg) of 1.0 g/10 min. and a density of 0.885 g/cm$^3$;
B) 20% of a random propylene-ethylene copolymer having 2.5% by weight of ethylene, a Xilene Soluble fraction XS of 7% and MFR of 1.2 g/10 min (230° C./2.16 Kg) ISO 1133. Was vulcanized dynamically operating in a Brabender mixer Plasticorder PL 2100. Composition (d) and the additives indicated in Table 1 were fed in the mixer and the grafting and crosslinking reactions were carried out in two consecutive steps.

In the grafting step:
the peroxide masterbatch Trigonox 101/50 (2,5-bis(tert-butylperoxy)-2,5-dimethylhexane, DHBP, 50% on silica carrier) from Akzo Chemicals;
the alkoxysilane VTMS A-171 by OSI specialties (Crompton); and
the hydrolysis catalyst di-n-butyl-tin-dilaurate (DBTL) by ACIMA.

were mixed with composition (c) before loading them into the mixing chamber. The temperature was set at 160° C. and the blade speed at 60 revolutions per minute (RPM). The silane grafting was carried out for 8 minutes.

The crosslinking step was then carried out dynamically by adding boric acid as water-developing agent in the Brabender and further mixing for 10 minutes.

The amounts (weight percentages) of composition (e) and of the additives and the properties of the vulcanized composition obtained are reported in Table 3.

COMPARATIVE EXAMPLE 4 (4c)

A polyolefin composition [composition (f)] consisting of the following components (percentages by weight):
A) 60% of Engage 8003, an ethylene-octene copolymer by Dow Chemical, that is believed to contain 70% by weight of ethylene and 30% by weight of 1-octene, having a Mooney viscosity of 22 (ML1+4 at 121° C.), MFR (190° C./2.16 kg) of 1.0 g/10 min. and a density of 0.885 g/cm$^3$;
B) 40% Propylene Ethylene heterophasic copolymer containing 11% by weight of ethylene, a Xilene Soluble fraction XS of 25% and MFR of 4 g/10 min (230° C./2.16 Kg) ISO 1133. comprising:
  25% of a rubber fraction with 45% by weight of ethylene and intrinsic viscosity of the xilene soluble fraction of 3.5.
  75% of a crystalline homopolymeric propylene fraction having a Xilene Soluble fraction XS of 4%
was vulcanized dynamically operating in a Brabender mixer Plasticorder PL 2100. Composition (f) and the additives indicated in Table 3 were fed in the mixer and the grafting and crosslinking reactions were carried out in two consecutive steps.

In the grafting step:
the peroxide masterbatch Trigonox 101/50 (2,5-bis(tert-butylperoxy)-2,5-dimethylhexane, DHBP, 50% on silica carrier) from Akzo Chemicals;
the alkoxysilane VTMS A-171 by OSI specialties (Crompton); and
the hydrolysis catalyst di-n-butyl-tin-dilaurate (DBTL) by ACIMA.

were mixed with composition (c) before loading them into the mixing chamber. The temperature was set at 160° C. and the blade speed at 60 revolutions per minute (RPM). The silane grafting was carried out for 8 minutes.

The crosslinking step was then carried out dynamically by adding boric acid as water-generating agent in the Brabender and further mixing for 10 minutes.

The amounts (weight percentages) of composition (f) and of the additives and the properties of the vulcanized composition obtained are reported in Table 3.

TABLE 1

| Property | Composition (a) | Composition (b) |
|---|---|---|
| Melt Flow Rate (MFR) g/10 min (230° C./2.16 Kg) | 0.6 | 0.6 |
| Elongation at break(%) | 1100 | 730 |
| Flexural modulus at 23° C.(MPa) | 80 | 20 |
| Compression set(%)(22 h-70° C.) | 90 | 90 |
| Haze (%) | — | 38.1 |

TABLE 2

| | | Examples | | | | |
|---|---|---|---|---|---|---|
| | | 1 | 2 | 3 | 4 | 5 |
| Polyolefin composition | a | 95.5 | 96.5 | | | |
| | b | | | 92.3 | 95.2 | 97.60 |
| alkoxysilane | VTMS | 3.1 | 3.1 | | 3.1 | 2.0 |
| | VMMS | | | 5.7 | | |
| peroxide | Trigonox 101/50* | 0.3 | 0.3 | 0.3 | 0.3 | |
| | Luperox 101** | | | | | 0.15 |
| Crosslinking agent | B(OH)$_3$ | 1.0 | water | 1.6 | 1.3 | water |
| catalyst | DBTL | 0.07 | 0.07 | 0.062 | 0.062 | 0.07 |
| properties after vulcanization | | | | | | |
| Compression set (%) (22 h-23° C.) | | | | | | 27 |
| Compression set (%) (22 h-70° C.) | | 64 | 56 | 52 | 55 | 51 |
| Compression set (%) (22 h-100° C.) | | | | | | |
| Elongation at break (%) | | 680 | 645 | 760 | 640 | 697 |
| Hardness (Shore A) | | 90 | 89 | 78 | 78 | 74 |
| Elongation at break (%)/ Compression set (%) (22 h-70° C.) | | 10.63 | 11.52 | 14.62 | 11.64 | 13.7 |

*2,5-bis(tert-butylperoxy)-2,5-dimethylhexane, DHBP, 50% on silica carrier (Akzo Chemicals)
**2,5-bis(tert-butylperoxy)-2,5-dimethylhexane, DHBP, 100%

TABLE 3

Comparative examples

| | | Examples | | | |
|---|---|---|---|---|---|
| | | 1c | 2c | 3c | 4c |
| Polyolefin composition | c | 96.11 | | | |
| | d | | 98.08 | | |
| | e | | | 96.74 | |
| | f | | | | 98.11 |
| alkoxysilane | VTMS | 1.99 | 1.19 | 1.19 | 1.15 |
| peroxide | Trigonox 101/50* | 0.20 | 0.22 | 0.22 | 0.20 |
| Crosslinking agent | B(OH)$_3$ | 1.67 | 0.44 | 2.18 | 0.49 |
| catalyst | DBTL | 0.04 | 0.07 | 0.07 | 0.03 |
| properties after vulcanization | | | | | |
| Compression set (%) (22 h-23° C.) | | 43 | | | |
| Compression set (%) (22 h-70° C.) | | 83 | 79 | 85 | 79 |
| Compression set (%) (22 h-100° C.) | | | 78 | 72 | 79 |
| Elongation at break (%) | | 613 | 720 | 427 | 448 |
| Hardness (Shore A) | | 87 | 42 | 41 | 41 |
| Elongation at break (%)/ Compression set (%) (22 h-70° C.) | | 7.4 | 9.1 | 5 | 6.1 |

*2,5-bis(tert-butylperoxy)-2,5-dimethylhexane, DHBP, 50% on silica carrier (Akzo Chemicals)

The invention claimed is:

1. A thermoplastic vulcanizate elastomer obtained by dynamic vulcanization of a heterophasic polyolefin composition (I) in presence of at least:
   (i) an alkenyl-substituted alkoxysilane grafting agent; and
   (ii) water;
   wherein said heterophasic polyolefin composition (I) has a flexural modulus of at most 150 MPa, and comprises:
   (a) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more than 80%; and
   (b) 60-95% of an elastomeric fraction of one or more copolymer(s) of ethylene, said copolymer(s) containing from 15% to less than 40% by weight of ethylene, and being soluble in xylene at ambient temperature in an amount of more than 70%, said thermoplastic vulcanizate elastomer having compression set values from 45 to 65%, a ratio of elongation at break to compression set values over 10 and hardness shore A values below 90.

2. The thermoplastic vulcanizate elastomer of claim 1, having elongation at break values over 600%.

3. The thermoplastic vulcanizate elastomer of claim 1, wherein the heterophasic polyolefin composition (I) is prepared by sequential polymerization in the presence of a highly stereospecific Ziegler-Natta catalyst.

4. Polymer compositions comprising a thermoplastic vulcanizate elastomer obtained by dynamic vulcanization of a heterophasic polyolefin composition (I) in presence of at least:
   (i) an alkenyl-substituted alkoxysilane grafting agent; and
   (ii) water;
   wherein said heterophasic polyolefin composition (I) has a flexural modulus of at most 150 MPa, and comprises:
   (a) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more than 80%; and
   (b) 60-95% of an elastomeric fraction of one or more copolymer(s) of ethylene, said copolymer(s) containing from 15% to less than 40% by weight of ethylene, and being soluble in xylene at ambient temperature in an amount of more than 70%, said thermoplastic vulcanizate elastomer having compression set values from 45 to 65%, a ratio of elongation at break to compression set values over 10 and hardness shore A values below 90.

5. Manufactured articles comprising a thermoplastic vulcanizate elastomer obtained by dynamic vulcanization of a heterophasic polyolefin composition (I) in presence of at least:
   (i) an alkenyl-substituted alkoxysilane grafting agent; and
   (ii) water;
   wherein said heterophasic polyolefin composition (I) has a flexural modulus of at most 150 MPa, and comprises:
   (a) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more than 80%; and
   (b) 60-95% of an elastomeric fraction of one or more copolymer(s) of ethylene, said copolymer(s) containing from 15% to less than 40% by weight of ethylene, and being soluble in xylene at ambient temperature in an amount of more than 70%, said thermoplastic vulcanizate elastomer having compression set values from 45 to 65%, a ratio of elongation at break to compression set values over 10 and hardness shore A values below 90.

6. The manufactured articles of claim 5, in the form of films, flexible foils, injection molded articles or extruded section articles.

7. A foamed polyolefin composition obtained by foaming a thermoplastic vulcanizate elastomer obtained by dynamic vulcanization of a heterophasic polyolefin composition (I) in presence of at least:
   (i) an alkenyl-substituted alkoxysilane grafting agent; and
   (ii) water;
   wherein said heterophasic polyolefin composition (I) has a flexural modulus of at most 150 MPa, and comprises:
   (a) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more than 80%; and
   (b) 60-95% of an elastomeric fraction of one or more copolymer(s) of ethylene, said copolymer(s) containing from 15% to less than 40% by weight of ethylene, and being soluble in xylene at ambient temperature in an amount of more than 70%, said thermoplastic vulcanizate elastomer having compression set values from 45 to 65%, a ratio of elongation at break to compression set values over 10 and hardness shore A values below 90.

8. Manufactured articles comprising a foamed polyolefin composition obtained by foaming a thermoplastic vulcanizate elastomer obtained by dynamic vulcanization of a heterophasic polyolefin composition (I) in presence of at least:
   (i) an alkenyl-substituted alkoxysilane grafting agent; and
   (ii) water;
   wherein said heterophasic polyolefin composition (I) has a flexural modulus of at most 150 MPa, and comprises:
   (a) 5-40% of a propylene homopolymer insoluble in xylene at ambient temperature in an amount of more than 90%, or a copolymer of propylene with ethylene and/or C4-C10 alpha-olefin(s), containing 90% or more of propylene, and being insoluble in xylene at ambient temperature in an amount of more than 80%; and (b) 60-95% of an elastomeric fraction of one or more copolymer(s) of ethylene, said copolymer(s) containing from 15% to less than 40% by weight of ethylene, and being soluble in xylene at ambient temperature in an amount of more than 70%, said thermoplastic vulcanizate elastomer having compression set values from 45 to 65%, a ratio of elongation at break to compression set values over 10 and hardness shore A values below 90.

9. A process for the preparation of the thermoplastic vulcanizate elastomer of claim 1 comprising the stages of:
(i) subjecting to mixing the heterophasic polyolefin composition (I); and, while mixing
(ii) grafting said heterophasic polyolefin composition with the grafting agent; and, after completion of stage (ii)
(iii) crosslinking the grafted composition with water added while mixing.

10. The process of claim 9, wherein the grafting agent comprises an alkenyl-substituted alkoxysilane and an organic peroxide.

11. The process of claim 10, wherein the alkenyl-substituted alkoxysilane is present in amounts ranging from 1% to 10% by weight with respect to the weight of the heterophasic polyolefin composition (I).

12. The process of claim 10, wherein the organic peroxide is present in amounts ranging from 0.05% to 1.5% with respect to the weight of the heterophasic polyolefin composition (I).

13. The process of claim 10, wherein the alkenyl-substituted alkoxysilane is selected from the group consisting of vinyltrimethoxysilane and methacryloxylpropyltrimethoxysilane.

14. The process of claim 10, wherein the organic peroxide is 2,5-bis(tert-butylperoxy)-2,5-dimethylhexane.

15. The process according to claim 9 wherein water is introduced in the cross-linking step (iii) with an in situ water-developing crosslinking agent.

16. The process according to claim 15, wherein the in situ water-developing crosslinking agent is selected from the group consisting of calcium citrate tetrahydrate, calcium lactate pentahydrate, magnesium sulfate eptahydrate, sodium sulfate decahydrate, blends of zinc oxide and carboxylic acid, adipic acid, boric acid and blends thereof.

17. The thermoplastic vulcanizate elastomer of claim 1 wherein component (b) contains from 15 to 38% by weight of ethylene.

18. The thermoplastic vulcanizate elastomer of claim 17 wherein component (b) contains from 15 to 35% by weight of ethylene.

* * * * *